No. 767,714. PATENTED AUG. 16, 1904.
F. RENFROW.
TURF CUTTING ATTACHMENT FOR PLOWS.
APPLICATION FILED JUNE 22, 1903.
NO MODEL.
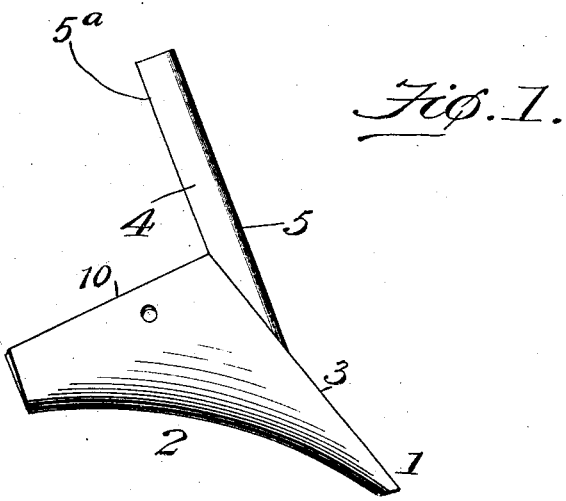
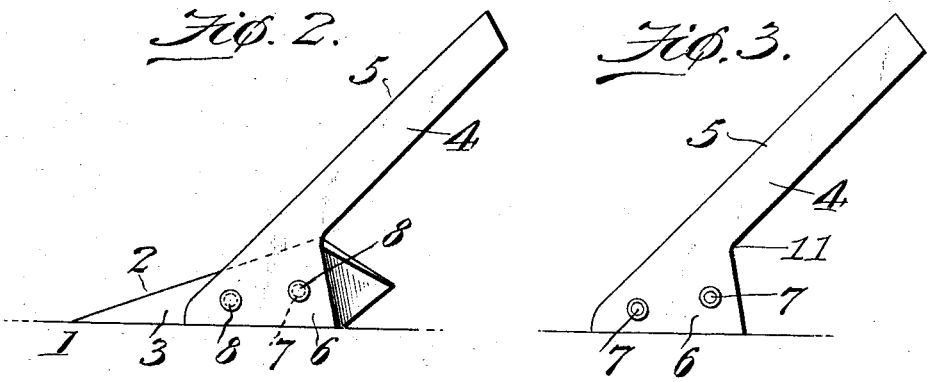

No. 767,714.

Patented August 16, 1904.

UNITED STATES PATENT OFFICE.

FRANK RENFROW, OF REDMONDVILLE, MISSISSIPPI.

TURF-CUTTING ATTACHMENT FOR PLOWS.

SPECIFICATION forming part of Letters Patent No. 767,714, dated August 16, 1904.

Application filed June 22, 1903. Serial No. 162,665. (No model.)

*To all whom it may concern:*

Be it known that I, FRANK RENFROW, a citizen of the United States, residing at Redmondville, in the county of Yazoo and State of Mississippi, have invented a new and useful Turf-Cutting Attachment for Plows, of which the following is a specification.

This invention relates to colters or cutters for plows of that class which are adapted to be connected with the landside of the point of any plow of ordinary construction, its purpose being to cut through the turf or soil, so as to facilitate the turning of the furrow-slice.

The object of my invention is to provide a device of this class which shall possess superior advantages in point of simplicity, durability, and general efficiency and by the use of which a plow equipped with my invention shall avoid being clogged by grass, roots, weeds, or other obstructions.

My invention therefore consists, essentially, in the peculiar shape of the colter or cutter which is to be hereinafter described, whereby a plow equipped therewith shall be practically self-cleaning, as will be hereinafter fully described, and particularly pointed out in the claim.

In the accompanying drawings, Figure 1 is a perspective view of a plow-point equipped with my improved colter or turf-cutter. Fig. 2 is a side elevation of the same seen from the landside. Fig. 3 is a detail view of the colter or turf-cutter detached.

Corresponding parts in the several figures are indicated by similar numerals of reference.

1 designates a plow-point of any suitable construction, said point having the share 2 and the landside 3.

4 designates my improved colter or turf-cutting attachment, which consists of an elongated blade having a cutting edge 5 extending from the lower to the upper extremity of its front side, said cutting edge being parallel to the back $5^a$ of the blade. Said cutting-blade is provided at its lower end with an angular foot 6, the lower edge of which is disposed at an angle of about forty-five degrees to the front cutting edge. The foot 6 is provided with perforations 7 for the reception of rivets 8, by means of which it is in practice secured to the landside of the point. When thus secured, it will be observed that the cutting edge of the device slopes back at an angle of about forty-five degrees to the surface of the soil, the slope of the upper edge of the landside being considerably less — say about twenty degrees. The cutting edge of the colter will thus be disposed at an angle of about one hundred and fifty-five degrees to the surface of the soil or the lower edge of the landside. Thus when the colter or cutter encounters the turf it will engage the latter with a long sloping cut, which is efficient in severing the roots of the weeds and plants encountered and which, furthermore, offers no obstruction that might possibly cause the clogging of the implement by becoming entangled with such obstructions. It will also be noticed that the under or rear edge of the cutter 4 is disposed directly adjacent to and in engagement with the upper edge 10 of the plow-point, thereby avoiding the existence of any angular recess between the plow and the cutter, which in devices of this description are extremely apt to become clogged. By the construction shown and described clogging is absolutely impossible at any point of the device, the material — such as grass, roots, and the like — which has been severed by the cutter passing directly over the rear edge of the plow-point, there being absolutely no place where roots or the like may hang or stick.

My improved colter or turf-cutting attachment is extremely simple in construction and inexpensive, and it may at a trifling cost be attached to the point of almost any plow now in general use.

By the construction herein described it will be noticed that an extremely slender blade may be used, the triangular foot at the lower end of said blade serving for the attachment of the device, while the portion of the blade which constitutes the cutter is narrow and slender. The attachment may be made to fit various sizes of plow-points, the proportions being in each case so arranged that the angle 11 between the heel of the foot-piece and the back of the blade shall coincide with the upper or rear edge of the plow-point.

Having thus described my invention, I claim—

A turf-cutting attachment adapted to be rigidly secured to the landside of a plow, the said attachment including an approximately triangular foot and a slender cutting-blade, the cutting edge of which forms an upward and rearward continuation of the front side of the foot, the back of said blade being parallel to the cutting edge and disposed at an angle to the heel of the triangular foot, said angle coinciding with the upper rear edge of the plow-point to which the device is attached.

In testimony that I claim the foregoing as my own I have hereto affixed my signature in the presence of two witnesses.

FRANK RENFROW.

Witnesses:
F. HOWARD,
W. S. DONELSON.